United States Patent [19]
Robbins

[11] Patent Number: 4,603,349
[45] Date of Patent: Jul. 29, 1986

[54] CABLE TELEVISION SYSTEM WITH STEREO SOUND REPRODUCTION

[75] Inventor: Clyde Robbins, Ft. Washington, Pa.

[73] Assignee: General Instrument Corporation, New York, N.Y.

[21] Appl. No.: 677,722

[22] Filed: Dec. 4, 1984

[51] Int. Cl.⁴ .................. H04N 7/10; H04N 7/167
[52] U.S. Cl. ........................... 358/86; 358/120; 358/121
[58] Field of Search ............ 358/86, 114, 120, 121, 358/144, 198; 455/3, 6, 4

[56] References Cited

U.S. PATENT DOCUMENTS

| | | |
|---|---|---|
| 4,095,258 | 6/1978 | Sperber . |
| 4,145,717 | 3/1979 | Guif et al. . |
| 4,163,252 | 7/1979 | Mistry et al. . |
| 4,405,944 | 9/1983 | Eilers et al. ............ 358/144 |
| 4,410,911 | 10/1983 | Field et al. ............. 358/121 |
| 4,471,379 | 9/1984 | Stephens ............... 358/120 |
| 4,471,380 | 9/1984 | Mobley ................ 358/120 |
| 4,494,142 | 1/1985 | Mistry ................ 358/114 X |
| 4,536,791 | 8/1985 | Campbell et al. ......... 358/114 X |

OTHER PUBLICATIONS

Eilers et al, "Television Multichannel Sound Broadcasting-A Proposal" *IEEE Transactions on Communications*, vol. CE-27, No. 3, Aug. 1981, pp. 398–409.

Gordon, "Stereo Unready-Why Your Cable Box Is Hopelessly Mono-tonous", *Video* magazine, Dec. 1984, vol. VIII, No. 9, pp. 117–118, 188–190.

*Primary Examiner*—Keith E. George
*Attorney, Agent, or Firm*—Kramer and Brufsky

[57] ABSTRACT

A cable television converter is retrofitted for use in reproducing stereophonic broadcast television sound. A composite signal is produced comprising the scrambled output signal from the converter tuner, the reception enable control signal from the converter's digital processor, and the output signal from the converter's remote control detection circuit. The composite signal is applied to a stereo adapter which separates the audio signal portion of the composite signal into left and right stereo signals, extracts the enable control signal from the composite signal, and outputs the left and right stereo signals for audio reproduction upon authorization indicated by the extracted enable control signal. Remote volume control and selection of a second audio program (SAP) is also provided.

19 Claims, 2 Drawing Figures

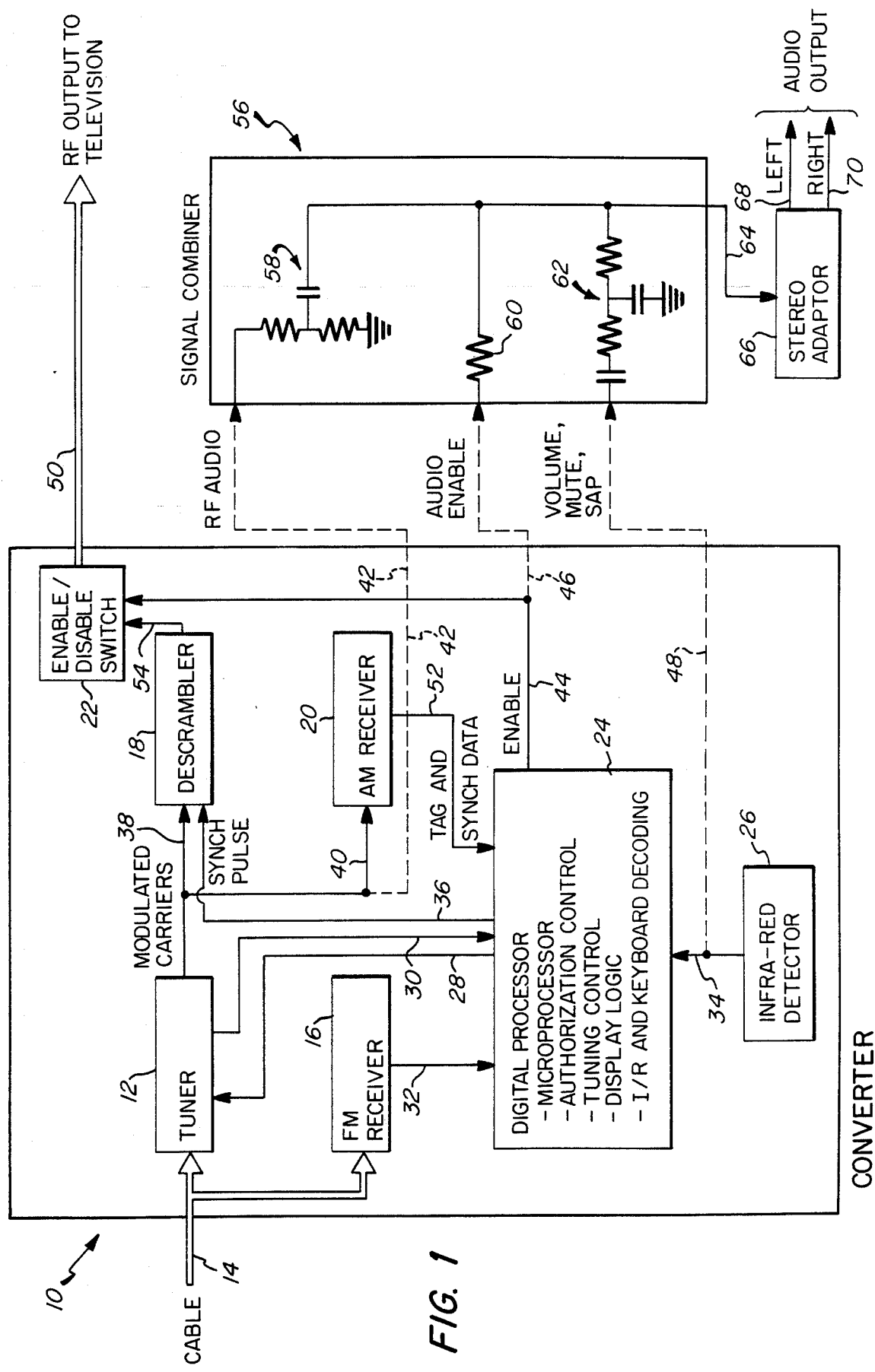

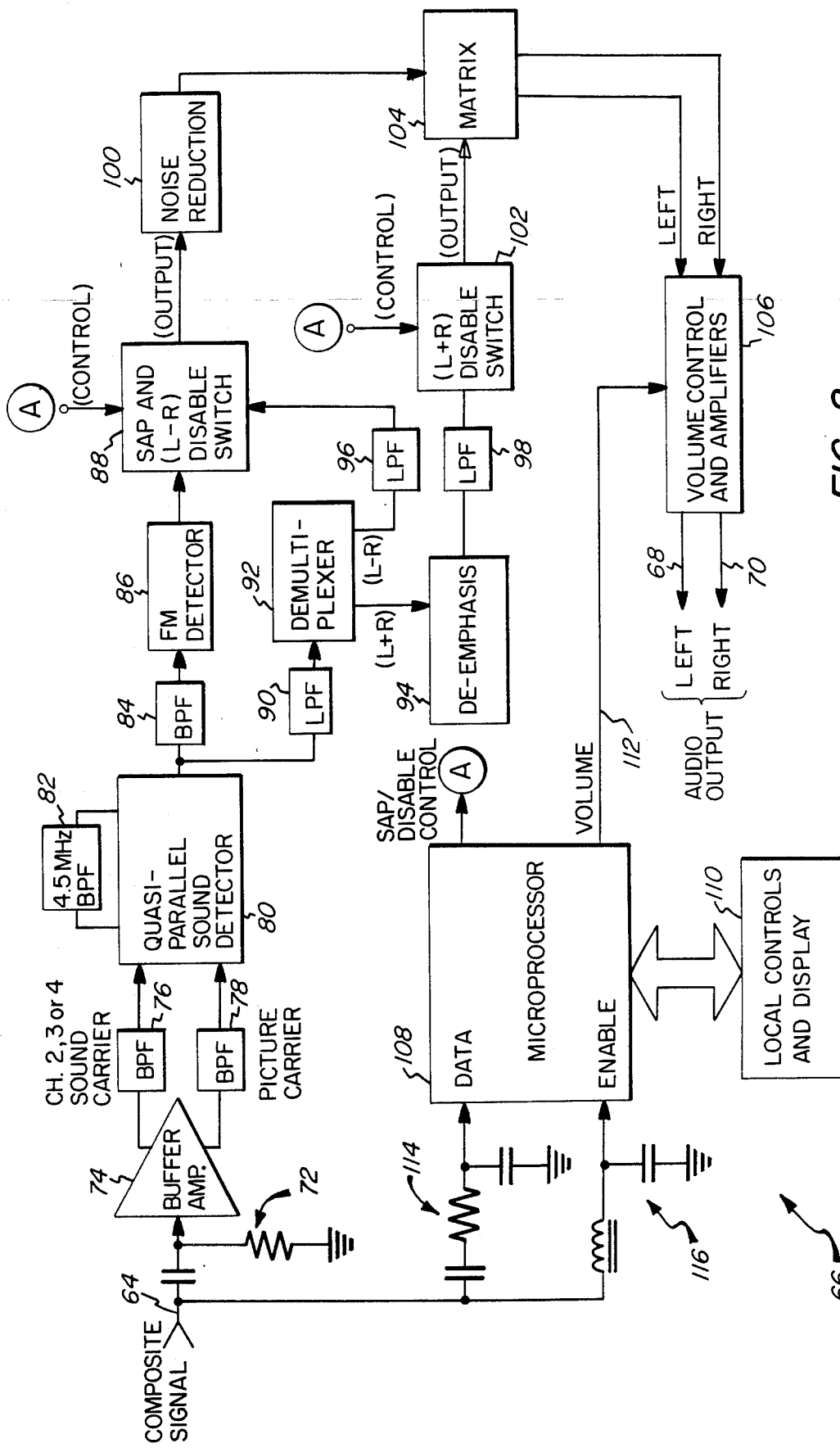

CABLE TELEVISION SYSTEM WITH STEREO SOUND REPRODUCTION

BACKGROUND OF THE INVENTION

The present invention relates to cable television systems and, in particular, to the retrofitting of existing cable television converters for use in accommodating stereo broadcast television sound.

The Federal Communications Commission has recently approved a standard for broadcasting stereophonic television sound. The standard approved utilizes the Zenith Broadcast Delivery System and the dbx noise-reduction system.

Cable television systems were not designed for stereo. When cable operators in the past desired to deliver stereo audio to their audiences, they bypassed the cable networks entirely and used a technique known as "FM simulcasting" wherein the audio portion of a television program was received on a viewer's separate stereo receiver. While this method is adequate for limited stereo broadcasting of a few channels, it does not provide an acceptable solution to the problem of receiving stereo broadcast signals through a cable network.

A major problem in accommodating stereo broadcast signals in existing cable networks is that the audio signals are carried on the cable together with video signals which are usually scrambled for security purposes. In the process of descrambling the video signals for viewing by an authorized subscriber, the stereo signal transmitted according to the Zenith/dbx technique is distorted. As a result, existing cable television converters are not compatible with the recently approved stereo broadcast television signals.

The inability of the currently installed base of millions of cable television converters to accommodate stereo reception is a substantial problem. It would be very costly for cable system operators to replace all of the converters currently in use with new converters specially adapted for use with stereo broadcast television signals. The magnitude of the problem is highlighted in an article entitled "Stereo Unready - Why Your Cable Box Is Hopelessly Mono-tonous", published in the December, 1984 issue of *Video* Magazine, volume VIII, Number 9, pgs. 117-118, 188-190. As the title of the article implies, it has been assumed that the current generation of cable television converters would have to be scrapped and replaced with new stereophonic converters. The present invention, however, provides an apparatus and method for stereophonic reproduction of stereo broadcast television sound using existing cable television converters. Simple modifications are made to each converter to enable the audio signals and several control signals to be tapped therefrom, combined, and input to a stereo adapter which provides left and right stereo outputs.

Past converters, such as those shown in U.S. Pat. Nos. 4,095,258 ("Sperber"); 4,145,717 ("Guif et al"); and 4,163,252 ("Mistry et al") provide descrambling of scrambled cable television signals but make no provision for stereo sound. Although Mistry et al suggest that a stereo demodulator chip can be used in conjunction with the audio circuits in their converter, the provision of such capability would require substantial modification of the converter circuitry. Mistry et al have not considered, nor do they make any suggestion as to how an existing base of cable television converters could be inexpensively modified for use in accommodating stereo broadcast television sound.

SUMMARY OF THE INVENTION

In accordance with the present invention, a cable television converter is provided having tuner means for selecting and outputting one of a plurality of incoming channels containing audio and scrambled video signals. A descrambler is coupled to the output of the tuner for descrambling video signals from the tuner. Means are provided for producing and outputting a first control signal, in accordance with an authorization code provided by a cable system operator, to enable or disable output of an unscrambled RF signal from the descrambler. First means are provided for coupling to the output of said tuner to obtain a selected channel signal prior to descrambling. Second means are provided for coupling to the output of the first control signal means to obtain the first control signal. Means are provided for combining the signals obtained by the first and second means into a composite signal. Stereo adapter means are coupled to receive the composite signal. The stereo adapter means separates the audio signal portion of the composite signal into left and right stereo signals and also extracts the first control signal from the composite signal. The stereo adapter means then outputs the left and right stereo signals for audio reproduction, upon authorization indicated by the extracted first control signal.

The apparatus of the invention can further comprise means for producing and outputting a second control signal containing volume control information, which information can be received from a remote control unit. The second control signal is added to the composite signal. When the composite signal is received by the stereo adapter means, the second control signal is extracted and used to adjust the amplitude of the left and right stereo signals.

Means can also be provided for producing and outputting a third control signal, to be added to the composite signal, in response to the actuation of a SAP selection switch. The stereo adapter extracts the third control signal from the composite signal and, in response thereto, replaces the left and right stereo signals with an alternate audio signal carried in the audio portion of the composite signal. In this manner, a second audio program ("SAP") can be received by the cable television subscriber.

The volume control and SAP selection control can be accomplished using a conventional hand held remote control unit. The descrambler provided in the converter can be, for example, a gated RF synch suppression descrambler.

BRIEF DESCRIPTION OF THE DRAWINGS

FIG. 1 is a block diagram showing the electrical circuitry of a converter which has been retrofitted in accordance with the present invention and coupled to a signal combiner and stereo adapter for providing stereophonic reproduction of stereo broadcast television sound; and FIG. 2 is a block diagram of a stereo adapter which can be used in connection with the present invention.

DETAILED DESCRIPTION OF THE INVENTION

The present invention allows the installed base of millions of cable television converters to be used, after a simple retrofit, for the reproduction of stereo broadcast television sound.

In the Zenith/dbx stereo broadcast delivery and noise-reduction systems, audio information is located in the region from about 4.4 to 4.6 MHz above the video carrier of a television channel allocation. The audio portion takes up only about 0.20 MHz, which is small compared to the large portion of bandwidth occupied by the video (luminance and chroma) signals. In the past, a monophonic audio channel was transmitted as an $L+R$ FM signal with a frequency range of 50–15,000 Hz. In the Zenith/dbx system, a pilot frequency signal has been added at 15,734 Hz to allow new stereo receivers to locate a second channel for stereo, which resides from 16.47–46.47 kHz from the bottom of the audio allocation. This second channel is the key to receiving stereo sound, as it is an $L-R$ AM signal with the same frequency range as the mono channel. Stereo is achieved when the $L-R$ and $L+R$ signals are combined.

A third channel, the second audio program or "SAP", is provided in the Zenith/dbx system for bilingual programming and other commentary. The SAP channel is FM and extends from about 65 to 95 kHz with a frequency range of 50 Hz to 12 kHz. Professional channels which may be used for voice or data can be inserted into the remaining audio space of about 98.2 kHz to 106.5 kHz.

Cable systems were not designed for stereo. In fact, in conventional gated RF synch suppression descramblers, a large percent of the AM modulation for the descrambling process falls in the band where the $L-R$ subcarrier is placed in the Zenith/dbx system. As a result, the descrambling process damages the $L-R$ AM signal resulting in unacceptable audio distortion and hum. It has therefore been assumed that a different descrambling process would have to be used in connection with cable systems providing stereo sound. This would require the replacement of many millions of converter boxes already in use.

Contrary to the assumptions made by those skilled in the art to date, the present invention provides apparatus and a method for making present day converters compatible with the new Zenith/dbx stereo broadcast scheme. In order to understand the operation of the present invention, a basic understanding of the gated RF synch suppression descrambling technique is helpful.

In the synch suppression descrambling technique, the television signal transmitted by cable systems is modified by reducing the level of the horizontal (and/or vertical) synhronization pulses carried in the video component of the cable signal. When such a modified signal is received by a television receiver, the television circuitry cannot lock onto the attenuated synchronization pulses, and therefore a scrambled picture will appear on the television screen. In order for authorized viewers to obtain a regular television picture, a descrambler is provided by the cable television operator for reinserting synchronization pulses into the video signal. Timing information for the synchronization pulses added by the descrambler is placed on the audio carrier portion of the cable television signal. In particular, the synchronization pulses are placed on the sound carrier using amplitude modulation (AM). The pulses can then be detected and output by an AM receiver coupled to receive the cable signal.

In addition to the synchronization pulses, additional information can be placed on the cable signal for detection by the AM receiver. In particular, "tag data" can be placed between synchronization pulses to identify authorization information transmitted by the cable system operator with a particular television program. A cable subscriber's converter will typically contain a digital processor to decode the tag data, and if that subscriber is authorized to receive the program, the descrambler output will be enabled and a descrambled signal will pass to the subscriber's television set.

FIG. 1 shows a conventional cable television converter 10 in block diagram form. One such converter is manufactured by the Jerrold Division of General Instrument Corporation, and designated as Model Number DRZN-3A.

Converter 10 includes a tuner 12 which is coupled to the incoming cable 14. An FM receiver 16 is also coupled to cable 14. FM receiver 16 is used to detect signals, placed on the cable by the cable system operator, for addressing the converter and defining which programs the subscriber using the converter is authorized to receive. The data detected by FM receiver 16 is transmitted to a digital processor 24 via line 32.

Tuner 12 is a dual conversion tuner which produces modulated video and audio carriers at its output for one of a plurality of channels transmitted over cable 14. A subscriber selects a channel using a keyboard coupled to digital processor 24 or alternately, with a hand-held remote control unit (not shown), the output of which is detected by infra-red detector 26. Remote control signals detected by detector 26 are input to digital processor 24 via line 34. Digital processor 24 decodes the channel information and sends a signal to tuner 12 via line 28 to tune in the selected channel. Return line 30 couples tuner 12 back to digital processor 24, providing a control loop for maintaining the selected channel.

The modulated carrier for the selected channel is passed from the output of tuner 12 to a gated RF synch suppression descrambler 18 via line 38, and to an AM receiver 20 via line 40. The modulated carriers contain audio and scrambled video signals. AM receiver 20 detects the synchronization data for use by descrambler 18, and couples this data to digital processor 24 via line 52. Digital processor 24 decodes the synchronization data from AM receiver 20 and forwards it to descrambler 18 via line 36. Descrambler 18 outputs a descrambled RF signal containing the audio and descrambled video information on line 54. Enable/disable switch 22 couples this signal to an authorized subscriber's television set via output cable 50.

Digital processor 24 produces and outputs a control signal on line 44 to enable/disable switch 22. If a subscriber is not authorized to receive a particular channel, the control signal from digital processor 24 will turn off enable/disable switch 22, precluding the subscriber from viewing the selected unauthorized program.

As noted above, each subscriber's converter is programmed by the cable system operator with information identifying programs which the subscriber is authorized to receive. This information is stored in digital processor 24. Each program transmitted by the cable system operator includes tag data which is detected by AM receiver 20 and coupled to digital processor 24 via line 52. Digital processor 24 will only produce the enable control signal if a program identified by particular tag data is authorized.

In cable television systems using monaural sound, the audio portion of the television signal is passed through descrambler 54 to the subscriber's television set via cable 50. As explained above, however, such an arrangement does not work with the Zenith/dbx stereo sound transmission scheme. In order to overcome this difficulty, the present invention taps the audio signal from tuner 12 before the descrambler stage. This is accomplished by coupling to the output of tuner 12, as shown by dashed line 42 in FIG. 1, to obtain the audio signal. At the same time, the enable control signal produced by digital processor 24 on line 44 is tapped into as illustrated by dashed line 46. In addition, the output of infra-red detector 26 can be tapped into as shown by dashed line 48 in FIG. 1. This enables information transmitted by a remote control to be accessed for use in controlling volume, providing a mute feature, and/or enabling selection of a SAP signal.

Each of the RF audio, audio enable, and volume/mute/SAP signals on lines 42, 46, and 48 respectively are combined in a signal combiner 56. The output of signal combiner 56 is a single composite signal appearing on line 64. Network 58 is used to add the signal coming from the output of tuner 12 to line 64. Resistor 60 couples the enable control signal from digital processor 24 to line 64. Network 62 is used to couple the volume/mute/SAP signal from infra-red detector 26 to line 64. Thus, with relatively few components, a composite signal can be provided for input to a stereo adapter 66.

Signal combiner 56 can be easily and economically retrofitted into standard cable television converters which are presently in use. As shown in FIG. 1, all that the retrofit entails is coupling to three existing signal lines in converter 10 and combining them into a composite signal using the few components which make up signal combiner 56. A single output coaxial cable 64 can then be coupled to stereo adapter 66 for processing the composite signal to achieve various features and reproduce stereo sound.

Stereo adapter 66 produces left and right stereo output signals on lines 68, 70 respectively. A block diagram of stereo adapter 66 is shown in FIG. 2.

The composite signal from signal combiner 56 is input to stereo adapter 66 on line 64. The RF audio portion of the composite signal is filtered by network 72 and passed to buffer amplifier 74. As is well known in the art, cable television converters such as converter 10 shown in FIG. 1 produce an output for reception on one channel of the subscriber's television receiver. Generally, the channel used is either channel 2, 3, or 4. Band pass filters 76 and 78 are provided to pass the sound and picture carriers, respectively, of the channel 2, 3, or 4 signal which comprises the RF portion of the composite signal input to stereo adapter 66. The filtered carriers are then input to a quasi-parallel sound detector 80 having a 4.5 MHz band pass filter 82 coupled thereto. Quasi-parallel sound detector 80 can consist of a standard integrated circuit chip, such as the Philips TDA-2546A component distributed by Signetics Corporation or the comparable TDA-4283 chip manufactured by Siemens. This circuit functions to demodulate the sound signal and further serves to remove distortion caused by the tag data and synchronization pulses which are present on the audio carrier.

The demodulated sound signal is input to a low pass filter 90 in series with a conventional demultiplexer 92 which separates the signal into separate L+R and L−R signals for use in providing stereo sound reproduction. The L+R signal is passed to a de-emphasis network 94, to a low pass filter 98, and an "L+R disable switch" 102. The L−R signal is passed through low pass filter 96 to "SAP and L−R disable switch" 88.

Switches 88 and 102 are controlled by a SAP/disable control signal produced by a microprocessor 108 in response to the audio enable and volume/mute/SAP data which are part of the composite signal input to stereo adapter 66. Network 114 passes the volume/mute/SAP data to microprocessor 108 and network 116 passes the audio enable signal to microprocessor 108.

When a subscriber viewing a program wishes to receive an authorized program with stereophonic sound, the SAP signal will not be selected, and the audio enable signal (which is the same control signal produced by digital processor 24 to enable reception of the descrambled video signal) will indicate to microprocessor 108 that switches 88 and 102 should be set to pass the L−R and L+R signals to matrix 104. Prior to reaching matrix 104, the L−R signal is passed through dbx noise-reduction circuit 100. Matrix 104 produces standard left and right stereo output signals which are coupled to volume control and amplifier circuitry 106.

As noted above, the Zenith/dbx broadcast system provides a SAP channel for bilingual programming and other commentary. The SAP signal is passed through a band pass filter 84 and detected by FM detector 86 provided in stereo adapter 66, as shown in FIG. 2. The signal is then passed to switch 88. If a subscriber wishes to view a program and listen to the SAP channel, a SAP switch is actuated on the remote control unit for the converter. Actuation of the SAP switch causes infra-red detector 26 to produce an appropriate signal which is added, by signal combiner 56, to the composite signal input to stereo adapter 66. The SAP signal is then coupled to microprocessor 108 via network 114 and an appropriate control signal is output to switches 88 and 102. This control signal actuates switches 88 and 102 to disable output of the L−R and L+R signals therefrom, and instead output the SAP channel from switch 88. The SAP channel then passes through matrix 104 to volume control and amplifiers 106, and is output on lines 68 and 70 to the subscriber's stereo amplifier system.

The provision of remotely controlled audio volume has been a desired but difficult to implement feature in cable television systems. The present invention, however, enables such remote volume control to be achieved in a straightforward manner. In particular, a subscriber's remote control unit is provided with a volume and/or mute switch. This causes a signal to be transmitted which is detected by infra-red detector 26 and is carried on line 48 to signal combiner 56. The volume and/or mute signal is then added to the composite signal which is input to stereo adapter 66. After passing through network 114, the volume and/or mute data is input to microprocessor 108 which, in turn, decodes the data and outputs a volume control signal on line 112. The volume control signal is input to volume control and amplifiers 106, where the gain of an amplifier is increased or decreased to provide volume control in a conventional manner.

A subscriber using the system of the present invention can connect the left and right audio output signals from stereo adapter 66 to a standard stereo sound system or to a television receiver having left and right channel inputs for stereo sound reproduction. Local controls and display 110, coupled to microprocessor 108, can be provided to enable a subscriber to monitor and control the operation of stereo adapter 66.

What is claimed is:

1. In a cable television converter having tuner means for selecting and outputting one of a plurality of incoming channels containing audio and scrambled video signals, a descrambler coupled to the output of said tuner for descrambling video signals from said tuner, and means for producing and outputting a first control signal to enable or disable output of an unscrambled RF signal from said descrambler in accordance with an authorization code provided by a cable system operator; the improvement comprising:
   first means for coupling to the output of said tuner to obtain a selected channel signal including a modulated audio carrier prior to said descrambler;
   second means for coupling to the output of said first control signal means to obtain said first control signal;
   means for summing the signals obtained by said first and second means into a composite signal; and
   stereo adapter means coupled to receive said composite signal for:
   detecting the audio signal portion of the composite signal and separating it into left and right stereo signals,
   extracting the first control signal from said composite signal, and
   outputting the left and right stereo signals for audio reproduction upon authorization indicated by the extracted first control signal.

2. The apparatus of claim 1 further comprising:
   means for producing and outputting a second control signal containing volume control information;
   third means for coupling to the output of said second control signal means to obtain said second control signal;
   means for adding the signal obtained by said third means to said composite signal; and
   means contained in said stereo adapter means for:
      extracting the second control signal from said composite signal, and
      adjusting the amplitude of said left and right stereo signals in response to the extracted second control signal.

3. The apparatus of claim 2 further comprising:
   means for producing and outputting a third control signal, to be added to said composite signal, in response to the actuation of a SAP selection switch; and
   means contained in said stereo adapter means for:
      extracting the third control signal from said composite signal, and
      replacing, in response to the extracted third control signal, said left and right stereo signals with an alternate audio signal carried in the audio portion of the composite signal.

4. The apparatus of claim 3 wherein said second and third control signal means comprise a remote control detector responsive to a remote control switch.

5. The apparatus of claim 2 wherein said second control signal means comprise a remote control detector responsive to a remote control switch.

6. The apparatus of claim 1 further comprising:
   means for producing and outputting a SAP control signal, to be added to said composite signal, in response to the actuation of a SAP selection switch; and
   means contained in said stereo adapter means for:
      extracting the SAP control signal from said composite signal, and
      replacing, in response to the extracted SAP control signal, said left and right stereo signals with an alternate audio signal carried in the audio portion of the composite signal.

7. The apparatus of claim 1 wherein said descrambler is a gated RF synch suppression descrambler.

8. In a cable television converter having tuner means for selecting and outputting one of a plurality of incoming channels containing audio and scrambled video signals, and a descramler coupled to the output of said tuner for descrambling video signals from said tuner and providing an unscrambled RF signal to be coupled to a television, the improvement comprising:
   first means for coupling to the output of said tuner to obtain a selected channel signal including a modulated audio carrier prior to said descrambler;
   second means for producing and outputting a first control signal containing volume control information;
   means for summing the signal obtained by said first means and the signal output by said second means into a composite signal; and
   stereo adapter means coupled to receive said composite signal for:
   detecting the audio signal portion of the composite signal and separating it into left and right stereo signals,
   extracting the first control signal from said composite signal,
   adjusting the amplitude of said left and right stereo signals in response to the extracted first control signal, and
   outputting the left and right stereo signals for audio reproduction.

9. The apparatus of claim 8 further comprising:
   means for producing and outputting a second control signal, to be added to said composite signal, in response to the actuation of a SAP selection switch; and
   means contained in said stereo adapter means for:
   extracting the second control signal from said composite signal, and
   replacing, in response to the extracted second control signal, said left and right stereo signals with an alternate audio signal carried in the audio portion of the composite signal.

10. The apparatus of claim 9 wherein said first and second control signal means comprise a remote control detector responsive to a remote control switch.

11. The apparatus of claim 8 wherein said descrambler is a gated RF synch suppression descrambler.

12. In a cable television converter having tuner means for selecting and outputting one of a plurality of incoming channels containing audio and scrambled video signals, and a descrambler coupled to the output of said tuner for descrambling video signals from said tuner and producing an unscrambled Rf signal for output to a television, the improvement comprising:
   first means for coupling to the output of said tuner to obtain a selected channel signal including modulated audio carriers prior to said descrambler;
   second means for producing and outputting a SAP control signal;

means for summing the signal obtained by said first means and the signal output by said second means into a composite signal; and stereo adapter means coupled to receive said composite signal for:

detecting stereo audio signal portions of the composite signal and separating them into left and right stereo signals, detecting an alternate audio signal carried in the composite signal, extracting the SAP control signal from said composite signal, and outputting either the left and right stereo signals or the alternate audio signal for audio reproduction in response to the status of the extracted SAP control signal.

13. The apparatus of claim 12 wherein said second means comprises a remote control detector responsive to a remote control switch.

14. The apparatus of claim 12 wherein said descrambler is a gated RF synch suppression descrambler.

15. A method for retrofitting a cable television converter for use with stereophonic broadcast television sound, said converter having tuner means for selecting and outputting one of a plurality of incoming channels containing audio and scrambled video signals, a descrambler coupled to the output of said tuner for descrambling video signals from said tuner, and means for producing and outputting a first control signal to enable or disable output of an unscrambled RF signal from said descrambler in accordance with an authorization code provided by a cable system operator, comprising the steps of:

tapping into the output of said tuner to obtain a selected channel signal including a modulated audio carrier prior to descrambling;

tapping into the output of said first control signal means to obtain said first control signal;

summing the selected channel signal with the first control signal to obtain a composite signal;

coupling the composite signal to a stereo adapter; and using the stereo adapter to:

detect the audio signal portion of the composite signal and separate it into left and right stereo signals, extract the first control signal from the composite signal; and output the left and right stereo signals for audio reproduction upon authorization indicated by the extracted first control signal.

16. The method of claim 15 comprising the further steps of:

producing and outputting a second control signal containing volume control information; adding the second control signal to said composite signal; and using the stereo adapter to:

extract the second control signal from the composite signal, and adjust the amplitude of said left and right stereo signals in response to the extracted second control signal.

17. The method of claim 16 comprising the further steps of:

producing and outputting a third control signal in response to the actuation of a SAP selection switch;

adding the third control signal to said composite signal; and using said stereo adapter to:

extract the third control signal from said composite signal, and replace, in response to the extracted third control signal, said left and right stereo signals with an alternate audio signal carried in the audio portion of the composite signal.

18. The method of claim 17 wherein said second and third control signals are obtained from a remote control detector responsive to a remote control switch.

19. The method of claim 18 wherein said descrambler is a gated RF synch suppression descrambler.

* * * * *